US012761503B2

(12) United States Patent
El Amrani et al.

(10) Patent No.: US 12,761,503 B2
(45) Date of Patent: Oct. 13, 2026

(54) ASSEMBLY FOR PRESSING AGAINST EACH OTHER TWO OPHTHALMIC LENSES IN ORDER TO BUILD AN ELECTROCHROMIC CELL

(71) Applicant: Essilor International, Charenton-le-Pont (FR)

(72) Inventors: Rachid El Amrani, Dijon (FR); Antoine Monvoisin, Beire le Fort (FR)

(73) Assignee: Essilor International, Charenton-le-Pont (FR)

( * ) Notice: Subject to any disclaimer, the term of this patent is extended or adjusted under 35 U.S.C. 154(b) by 289 days.

(21) Appl. No.: 18/571,056

(22) PCT Filed: Jun. 14, 2022

(86) PCT No.: PCT/EP2022/066108
§ 371 (c)(1),
(2) Date: Dec. 15, 2023

(87) PCT Pub. No.: WO2022/263410
PCT Pub. Date: Dec. 22, 2022

(65) Prior Publication Data
US 2024/0280838 A1 Aug. 22, 2024

(30) Foreign Application Priority Data
Jun. 17, 2021 (EP) .................................... 21305830

(51) Int. Cl.
*G02C 7/10* (2006.01)
*G02C 7/02* (2006.01)
(Continued)

(52) U.S. Cl.
CPC ............. *G02C 7/101* (2013.01); *G02C 7/021* (2013.01); *G02F 1/157* (2013.01); *G02F 1/161* (2013.01); *G02C 2202/08* (2013.01)

(58) Field of Classification Search
CPC ..... G02C 7/101; G02C 2202/16; G02F 1/157; G02F 1/153; G02F 1/161; G02F 1/15;
(Continued)

(56) References Cited

U.S. PATENT DOCUMENTS 5,928,537 A * 7/1999 Fortune .................. H10P 72/78
219/230
6,214,261 B1 * 4/2001 Smarto .................. B29C 70/76
156/107
(Continued)

FOREIGN PATENT DOCUMENTS

CN 1945794 4/2007
EP 3 320 394 B1 9/2020
KR 970042043 A 7/1997

OTHER PUBLICATIONS

International Search Report & Written Opinion issued Sep. 15, 2022 in PCT/EP2022/066108, filed on Jun. 14, 2022, 12 pages.
(Continued)

*Primary Examiner* — Bumsuk Won
*Assistant Examiner* — Seth D Moser
(74) *Attorney, Agent, or Firm* — Oblon, McClelland, Maier & Neustadt, L.L.P.

(57) ABSTRACT

An assembly includes a first ophthalmic lens having a first internal face and a first external face, a second ophthalmic lens having a second internal face and a second external face, the second ophthalmic lens being superposed on the first ophthalmic lens, a pressing device, adapted to contact one of the first and second ophthalmic lenses in a contact area and to press the first and second ophthalmic lenses against each other in order to build an electrochromic cell including a cavity delimited by the first and second internal faces, an adhesive substance applied on at least one predetermined point of at least one of the first and second internal faces in order to seal the cavity, and a holder provided with
(Continued)

a vacuum propagating element enabling the holder to grip one of the first and second external faces.

10 Claims, 3 Drawing Sheets

(51) Int. Cl.
*G02F 1/157* (2006.01)
*G02F 1/161* (2006.01)

(58) Field of Classification Search
CPC .......... B29D 11/00432; B29D 11/0073; B29D 11/00807
USPC .................................. 351/178, 177; 359/265
See application file for complete search history.

(56) References Cited

U.S. PATENT DOCUMENTS

| | | | | |
|---|---|---|---|---|
| 11,624,962 | B2 * | 4/2023 | Kloeppner | G02F 1/161 359/265 |
| 11,774,826 | B2 * | 10/2023 | Yutani | G02F 1/161 359/265 |
| 2004/0027501 | A1 * | 2/2004 | Blum | G02F 1/29 349/13 |
| 2007/0209393 | A1 * | 9/2007 | Miller | G02C 7/101 65/17.6 |
| 2009/0262411 | A1 * | 10/2009 | Karmhag | G02C 7/101 156/151 |
| 2018/0196283 | A1 * | 7/2018 | Ballet | B29D 11/00807 |
| 2019/0077139 | A1 | 3/2019 | Matz et al. | |
| 2020/0311661 | A1 * | 10/2020 | Stein | G02C 13/001 |
| 2023/0185112 | A1 * | 6/2023 | Meynen | G02C 7/083 |

OTHER PUBLICATIONS

European Search Report issued Oct. 20, 2021 in EP Application 21305830.8, filed on Jun. 17, 2021, 8 pages.
Office Action issued on May 26, 2026, in the corresponding Chinese application No. 202280040446.X with English translation (13 pages).

* cited by examiner

ASSEMBLY FOR PRESSING AGAINST EACH OTHER TWO OPHTHALMIC LENSES IN ORDER TO BUILD AN ELECTROCHROMIC CELL

CROSS-REFERENCE TO RELATED APPLICATION

The present application is a national stage application of PCT Application No: PCT/EP2022/066108, filed Jun. 14, 2022, which claims priority to European Patent Application No. 21305830.8, filed on Jun. 17, 2021. The benefit of priority is claimed to each of the foregoing, and the entire contents of each of the foregoing are incorporated herein by reference.

FIELD OF THE DISCLOSURE

The present disclosure relates to an assembly for pressing against each other two ophthalmic lenses in order to build an electrochromic cell.

BACKGROUND OF THE DISCLOSURE

An electrochromic cell has typically a structure comprising two curved transparent outer layers that are two ophthalmic lenses, the inner surfaces of which are covered by a transparent electrically conductive coating.

Document EP 3 320 394 B1 discloses an ophthalmic device with an electrochromic cell.

The cavity located between the two electrically conductive coatings is filled with an electrochromic composition.

Thus, the light transmission factor of the cell can be varied, by applying an electrical field between the electrically conductive coatings.

The maintaining of the two outer layers and the closing of the cavity are performed by means of a peripheral sealing joint.

In order to obtain the desired thickness for the cell without damaging the glue path of the sealing joint, while applying a homogeneous pressing effort all around the lenses, it is important to have the lenses gripped by a chuck having an appropriate design.

Therefore, there is an unfulfilled need for an assembly that makes it possible to spread over the whole lens surface the effort dispensed by the pressing system and that is adapted to a maximum amount of lens shapes, as well as to the lens curvature.

Document US 2020/0311661 A1 discloses an integrated system and method for manufacturing, categorizing and dispensing eyeglasses.

Document US 2019/0077139 A1 discloses machines for transferring a preformed functional film onto an ophthalmic substrate and a method for producing an ophthalmic lens comprising a method for transferring the preformed film onto the substrate.

SUMMARY OF THE DISCLOSURE

An object of the disclosure is to overcome at least some of the above-mentioned limitations of the prior art and fulfill the above-mentioned need.

To that end, the disclosure provides an assembly according to claim 1.

Thus, the possibility to select the most appropriate design for the pressing device makes it possible for the proposed assembly to provide a good distribution of the pressing effort around the lens edge and to be adapted to a large number of lens shapes.

Particular possible features, which may be combined or taken alone, of the assembly succinctly described above, are recited in the dependent claims.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE DISCLOSURE

Figure 1:
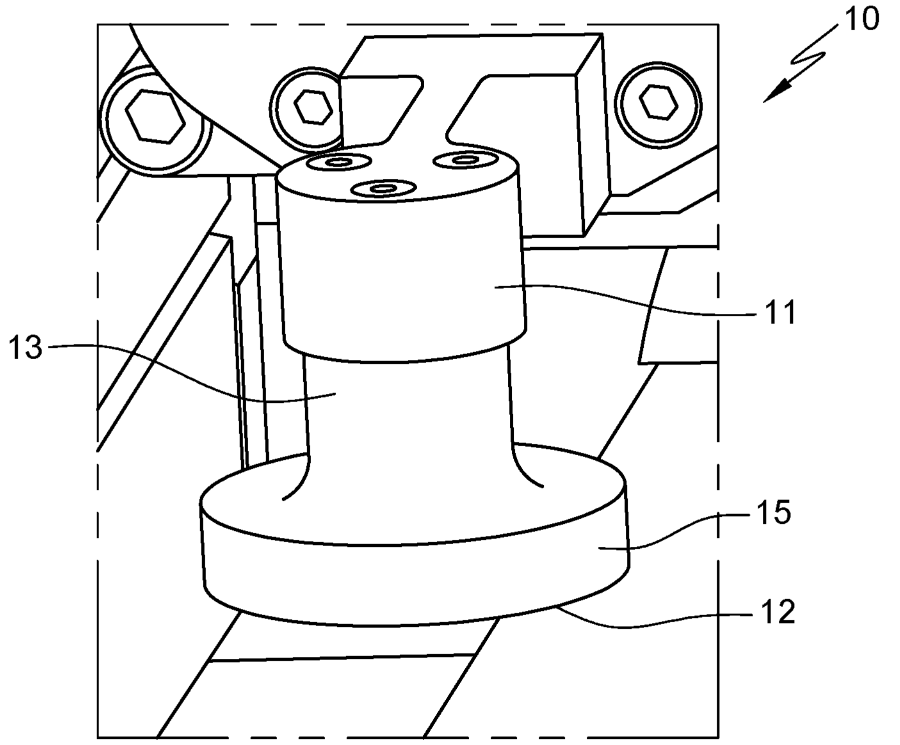
FIG. 1 is a schematic perspective view of an assembly according to the disclosure, in a first particular embodiment.

In the description which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may embodied in a wide variety of contexts. Embodiments discussed herein are merely representative and do not limit the scope of the disclosure. It will also be obvious to one skilled in the art that all the technical features that are defined relative to a process can be transposed, individually or in combination, to a device and conversely, all the technical features relative to a device can be transposed, individually or in combination, to a process and the technical features of the different embodiments may be exchanged or combined with the features of other embodiments.

The terms “comprise” (and any grammatical variation thereof, such as “comprises” and “comprising”), “have” (and any grammatical variation thereof, such as “has” and “having”), “contain” (and any grammatical variation thereof, such as “contains” and “containing”), and “include” (and any grammatical variation thereof such as “includes” and “including”) are open-ended linking verbs. They are used to specify the presence of stated features, integers, steps or components or groups thereof, but do not preclude the presence or addition of one or more other features, integers, steps or components or groups thereof. As a result, a method, or a step in a method, that “comprises”, “has”, “contains”, or “includes” one or more steps or elements possesses those one or more steps or elements, but is not limited to possessing only those one or more steps or elements.

An assembly 10 according to the present disclosure as shown in FIGS. 1 to 6 comprises a first ophthalmic lens having a first internal face and a first external face and a second ophthalmic lens having a second internal face and a second external face. The lenses are referred to by reference sign 12 in the drawings.

The second lens is superposed on the first lens, or vice versa.

The assembly 10 further comprises a pressing device. The pressing device is adapted to contact one of the lenses 12 in a contact area and to apply a predetermined pressure effort to press the lenses 12 against each other, in order to build an electrochromic cell comprising a cavity delimited by the first and second internal faces of the lenses 12.

The assembly 10 further comprises an adhesive substance that is applied on one or more predetermined points of at least one of the first and second internal faces of the lenses 12, in order to seal the cavity.

The assembly 10 further comprises a holder 11 provided with a vacuum propagating element enabling the holder 11 to grip one of the first and second external faces of the lenses 12.

In the embodiments of the assembly 10 shown in FIGS. 1 to 5, the holder 11 comprises a tubular rod 13 and the pressing device comprises a cup 15. The cup 15 is arranged at an end of the tubular rod 13 that corresponds to the bottom end of the assembly 10. The cup 15 has a central hole 17, the tubular rod 13 and the central hole 17 forming a duct for propagating vacuum that will make it possible for the holder 11 to grip the lens 12 that is placed in the cup 15.

Figure 2:
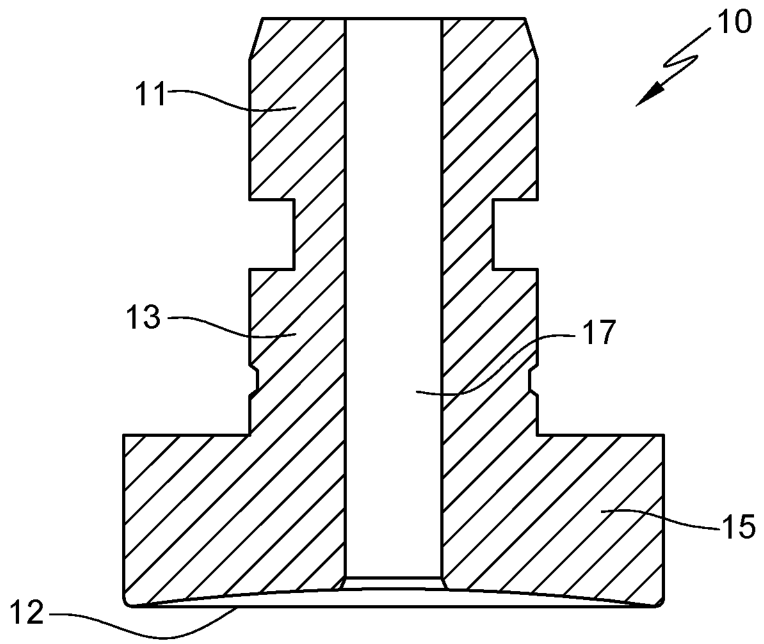
FIG. 2 is a schematic longitudinal sectional view of the assembly of FIG. 1.
Figure 3:
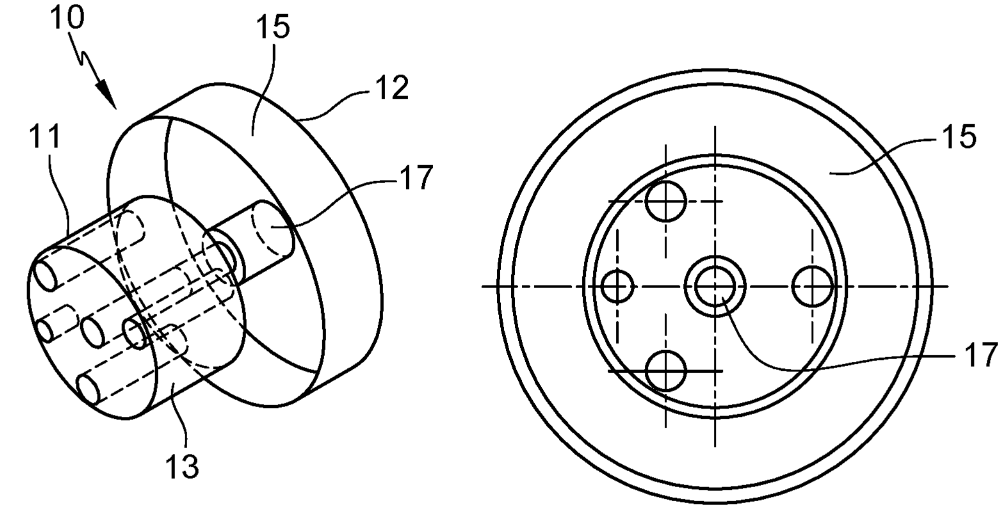
FIG. 3 is a pair of schematic views showing perspective and bottom views of an assembly according to the disclosure, in the first embodiment.

In the embodiment shown in FIGS. 1 to 3, the cup 15 has a circular i.e. round shape, which is the preferred embodiment for adapting to a great variety of lens shapes. More generally, the shape of the cup 15 is advantageously adapted to the shape of the surface of the lens 12 that is gripped by the holder 11.

Optionally, the cup 15 may have a circumferential groove provided with a toric joint for improving the gripping of the lens 12. As a variant, the cup 15 may have a predetermined radius of curvature and a specific radius that improve sucking the lens 12 by the vacuum propagating element during movement of the assembly, at the time of superposing the two lenses on each other.

Figure 4:
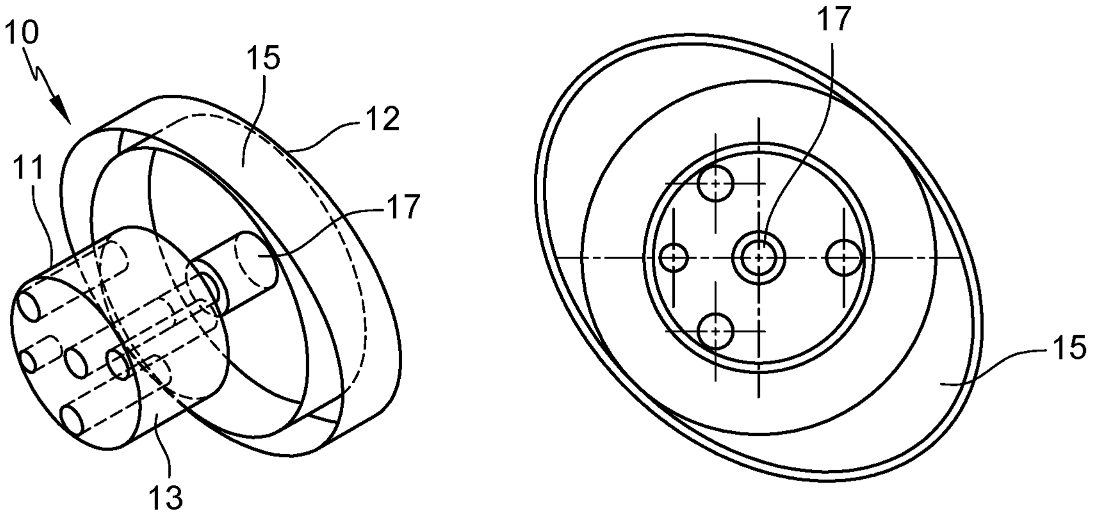
FIG. 4 is a pair of schematic views showing perspective and bottom views of an assembly according to the disclosure, in a second particular embodiment.

In the embodiment shown in FIG. 4, the cup 15 has an oval shape, which is advantageous when the lenses 12 have a length higher than their height.

Figure 5:
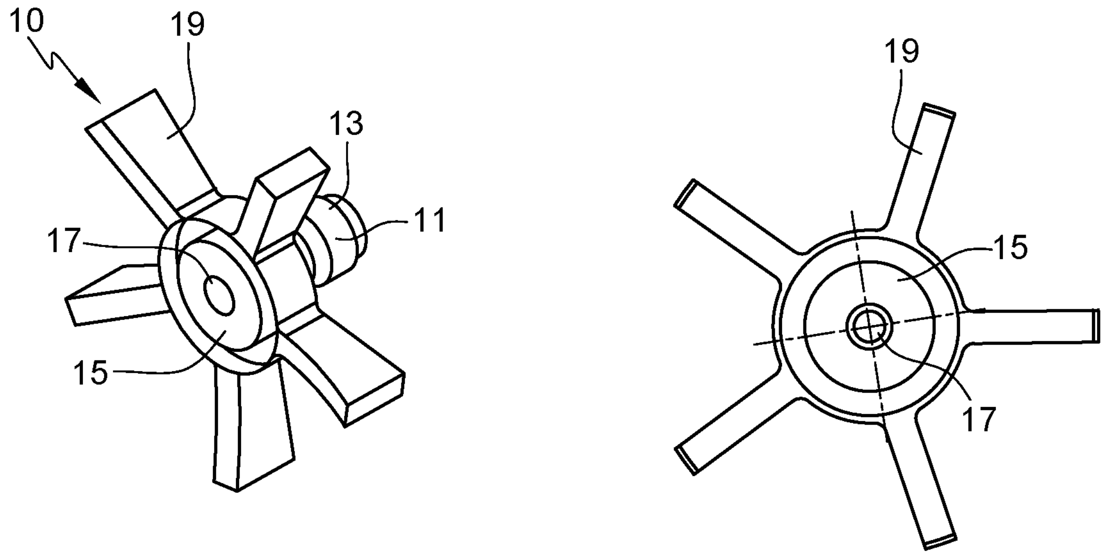
FIG. 5 is a pair of schematic views showing perspective and bottom views of an assembly according to the disclosure, in a third particular embodiment.

In the embodiment shown in FIG. 5, the cup 15 has the shape of a star with a predetermined number of branches 19. By way of non-limiting example, the illustrated cup 15 has five branches. However, the number of branches may be different, for example six or more, or less than five.

In the embodiments of FIGS. 1 to 5, the pressing device contacts one of the lenses 12 in a contact area that is located in the central area of the lenses 12.

In a particular embodiment, the contact area may pertain to a portion of the central area of the lenses defined as a circular region having a diameter of 30 mm around the geometrical center of the circumscribed rectangle containing the lenses.

Figure 6:
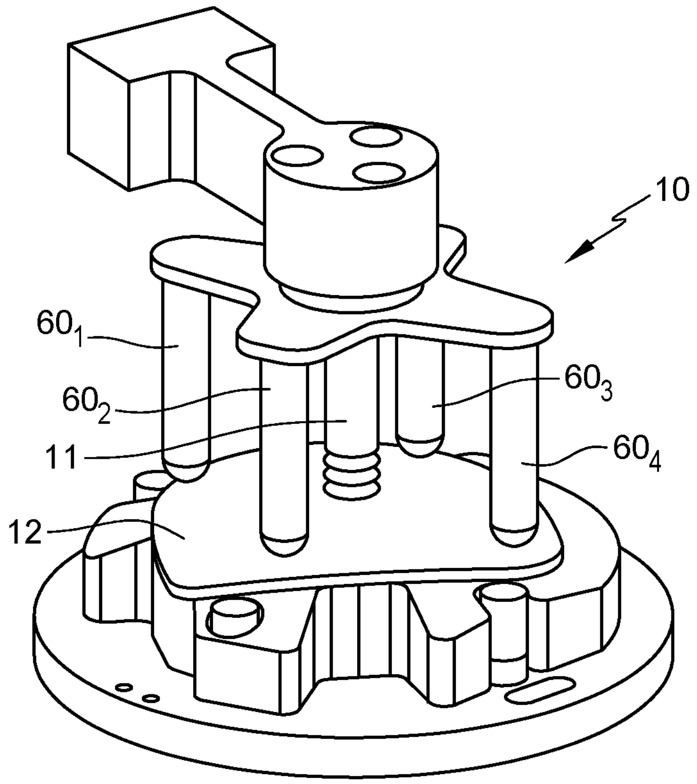
FIG. 6 is a schematic perspective view showing an assembly according to the disclosure, in a fourth particular embodiment.

On the other hand, in the embodiment shown in FIG. 6, the contact area is located in edge areas of the lenses 12. Namely, in that embodiment, the pressing device comprises a plurality of pressing pins $\mathbf{60}_N$, where N is an integer greater than or equal to one.

Additionally, in that embodiment, the suction function is dissociated from the pressing function, as the holder 11 is located centrally with respect to the lenses 12 does not have any pressing function and the pressing pins $\mathbf{60}_N$ do not have any suction function.

In the particular embodiment shown in FIG. 6, the plurality of pressing pins $\mathbf{60}_N$ are equally distributed circumferentially, at predetermined respective distances from the holder 11. The distances may for example be equal to each other.

By way of non-limiting example, the plurality of pressing pins may comprise three or four pins. By way of non-limiting example, in the assembly shown in FIG. 6, N=4.

Although representative devices have been described in detail herein, those skilled in the art will recognize that various substitutions and modifications may be made without departing from the scope of what is described and defined by the appended claims.

The invention claimed is:

1. An assembly comprising:

a first ophthalmic lens having a first internal face and a first external face;

a second ophthalmic lens having a second internal face and a second external face, said second ophthalmic lens being superposed on said first ophthalmic lens;

a pressing device, adapted to contact one of said first and second ophthalmic lenses in a contact area and to press said first and second ophthalmic lenses against each other in order to build an electrochromic cell comprising a cavity delimited by said first and second internal faces;

an adhesive substance applied on at least one predetermined point of at least one of said first and second internal faces in order to seal said cavity; and a holder provided with a vacuum propagating element enabling said holder to grip one of said first and second external faces, said contact area being located in a central area of said first and second ophthalmic lenses and said holder comprising a tubular rod and said pressing device comprising a cup arranged at an end of said tubular rod, said cup having a central hole, said tubular rod and said central hole forming a duct for propagating said vacuum.

2. The assembly according to claim 1, wherein said cup has a round shape.

3. The assembly according to claim 2, wherein said cup has a circumferential groove provided with a toric joint.

4. The assembly according to claim 1, wherein said cup has an oval shape.

5. The assembly according to claim 4, wherein said cup has a circumferential groove provided with a toric joint.

6. The assembly according to claim 1, wherein said a cup has a star shape.

7. The assembly according to claim 6, wherein said cup has five branches.

8. The assembly according to claim 7, wherein said cup has a circumferential groove provided with a toric joint.

9. The assembly according to claim 6, wherein said cup has a circumferential groove provided with a toric joint.

10. The assembly according to claim 1, wherein said cup has a circumferential groove provided with a toric joint.

* * * * *